(12) United States Patent
Zhao et al.

(10) Patent No.: US 11,377,910 B2
(45) Date of Patent: Jul. 5, 2022

(54) POLYCRYSTALLINE DIAMOND COMPACT

(71) Applicant: SF Diamond Co., Ltd., Zhengzhou (CN)

(72) Inventors: Dongpeng Zhao, Zhengzhou (CN); Weifeng Du, Zhengzhou (CN); Shanshan Ma, Zhengzhou (CN); Tongjian Niu, Zhengzhou (CN); Haijiang Fang, Zhengzhou (CN)

(73) Assignee: SF DIAMOND CO., LTD., Zhengzhou (CN)

( * ) Notice: Subject to any disclaimer, the term of this patent is extended or adjusted under 35 U.S.C. 154(b) by 54 days.

(21) Appl. No.: 16/543,607

(22) Filed: Aug. 18, 2019

(65) Prior Publication Data

US 2019/0368277 A1 Dec. 5, 2019

Related U.S. Application Data

(63) Continuation-in-part of application No. PCT/CN2017/118736, filed on Dec. 26, 2017.

(30) Foreign Application Priority Data

Nov. 15, 2017 (CN) .............................. 201721524171

(51) Int. Cl.
*B24D 3/02* (2006.01)
*E21B 10/567* (2006.01)
*C04B 37/02* (2006.01)
*B24D 3/00* (2006.01)
*B24D 11/00* (2006.01)
*B24D 18/00* (2006.01)
*C09K 3/14* (2006.01)

(52) U.S. Cl.
CPC ........ *E21B 10/5673* (2013.01); *C04B 37/021* (2013.01); *B24D 18/00* (2013.01); *C04B 2237/363* (2013.01); *C04B 2237/401* (2013.01); *C04B 2237/64* (2013.01)

(58) Field of Classification Search
CPC .............. E21B 10/5673; C04B 37/021; C04B 2237/363; C04B 2237/401; C04B 2237/64; C04B 2235/95; C04B 2235/427; C04B 35/528; B24D 18/00
USPC ........... 106/293, 307, 309; 51/293, 307, 309
See application file for complete search history.

(56) References Cited

U.S. PATENT DOCUMENTS 9,404,310 B1 * 8/2016 Sani ..................... E21B 10/5673
2016/0032657 A1 * 2/2016 Zhang ................. E21B 10/5673
175/430

* cited by examiner

*Primary Examiner* — James E McDonough
(74) *Attorney, Agent, or Firm* — Matthias Scholl P.C.; Matthias Scholl

(57) ABSTRACT

A polycrystalline diamond compact including a cemented carbide substrate and a polycrystalline diamond layer bonded to the cemented carbide substrate. The polycrystalline diamond layer is nonplanar and includes a central part and a peripheral part surrounding the central part. The central part includes a protruding surface relative to the peripheral part. The protruding surface is spherical or planar. The peripheral part includes a plurality of radially-disposed ridges.

10 Claims, 4 Drawing Sheets

POLYCRYSTALLINE DIAMOND COMPACT

CROSS-REFERENCE TO RELATED APPLICATIONS

This application is a continuation-in-part of International Patent Application No. PCT/CN2017/118736 with an international filing date of Dec. 26, 2017, designating the United States, now pending, and further claims foreign priority benefits to Chinese Patent Application No. 201721524171.X filed Nov. 15, 2017. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND

This disclosure relates to the field of composite materials, and more particularly, to a polycrystalline diamond compact (PDC).

Polycrystalline diamond compacts (PDCs) are composed of diamond and a cemented carbide substrate and are widely used in manufacturing of drill bits. However, conventional PDCs have a flat surface, exhibit relatively low working efficiency, and the cutting edges of the PDCs tend to break down.

SUMMARY

Disclosed is a polycrystalline diamond compact that has relatively high impact resistance.

Disclosed is a polycrystalline diamond compact comprising a cemented carbide substrate and a polycrystalline diamond layer bonded to the cemented carbide substrate. The polycrystalline diamond layer is nonplanar and comprises a central part and a peripheral part surrounding the central part; the central part comprises a protruding surface relative to the peripheral part; the protruding surface is spherical or planar; and the peripheral part comprises a plurality of radially-disposed ridges.

The peripheral part can comprise a chamfer.

The area of the protruding surface can account for 5-95% of the total surface area of the central part and the peripheral part.

The area of the protruding surface accounts for 25-75% of the total surface area of the central part and the peripheral part.

The vertical distance between a highest point and a lowest point of the protruding surface defines the height of the protruding surface, and a vertical distance between the highest point of the protruding surface and the bottom surface of the polycrystalline diamond layer defines the thickness of the polycrystalline diamond layer; the height of the protruding surface is between $1/50$ and $9/10$ of the thickness of the polycrystalline diamond layer.

The height of the protruding surface can be between $1/7$ and $3/7$ of the thickness of the polycrystalline diamond layer.

The thickness of the polycrystalline diamond layer can be between 0.5 and 8.0 mm, particularly between 2.0 and 4.0 mm.

The height of the protruding surface is between 0.01 and 7.2 mm, particularly between 0.2 and 0.8 mm.

The plurality of ridges each can comprise a top angle which is between 50° and 179° facing the cemented carbide substrate.

The radial length of the plurality of ridges on the peripheral part can be between $1/50$ and $1/3$ of the diameter of the polycrystalline diamond layer.

Advantages of the polycrystalline diamond compact in the disclosure are summarized as below. The design of the non-planar polycrystalline diamond layer improves the impact resistance of the polycrystalline diamond compact. The arrangement of the plurality of ridges functioning as cutter teeth reduces the cutting resistance of the polycrystalline diamond compact. The polycrystalline diamond compact exhibits relatively high drilling efficiency, and no failure such as teeth collapse occurs.

DETAILED DESCRIPTION

Figure 1:
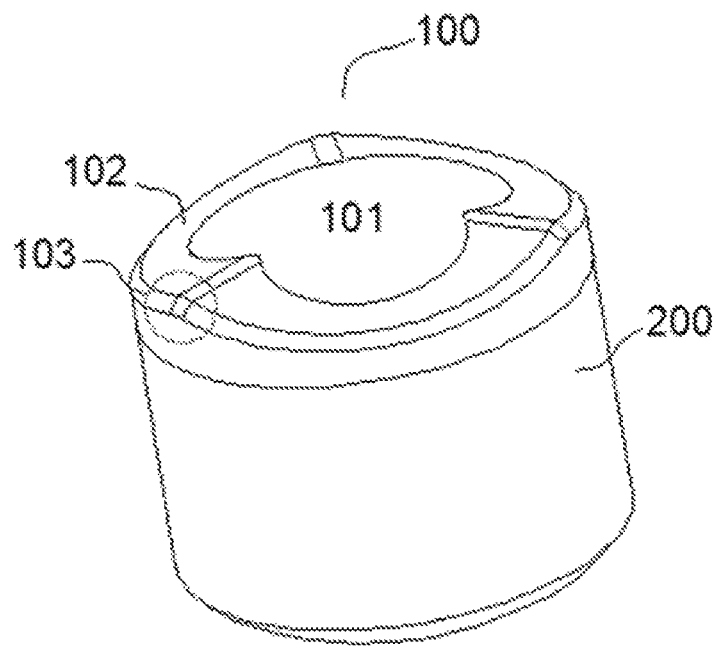
FIG. 1 is a schematic diagram of a polycrystalline diamond compact as described in the disclosure.

To further illustrate, examples detailing a polycrystalline diamond compact are described below. It should be noted that the following examples are intended to describe and not to limit the description.

FIGS. 1-4 shows a polycrystalline diamond compact comprising a cemented carbide substrate 200 and a polycrystalline diamond layer 100 bonded to the cemented carbide substrate. The polycrystalline diamond layer 100 is nonplanar and comprises a central part 101 and a peripheral part 102 surrounding the central part 101. The central part 101 comprises a protruding surface relative to the peripheral part 101. The protruding surface is spherical or planar. The peripheral part 102 comprises a plurality of ridges 103. The peripheral part comprises a chamfer. Optionally, the peripheral part can also comprise no chamfer.

Figure 2:
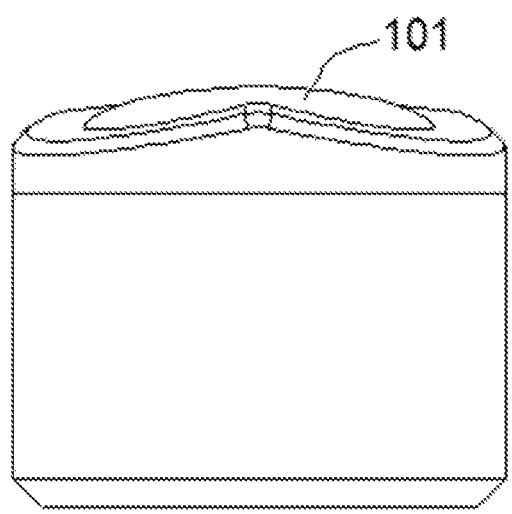
FIG. 2 is a front view of the polycrystalline diamond compact in FIG. 1.
Figure 3:
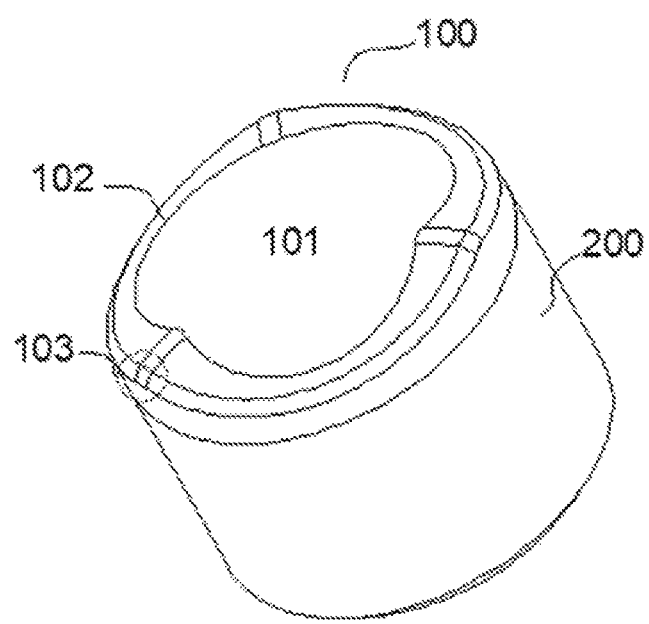
FIG. 3 is a schematic diagram of a polycrystalline diamond compact having a spherical central surface as described in the disclosure.
Figure 4:
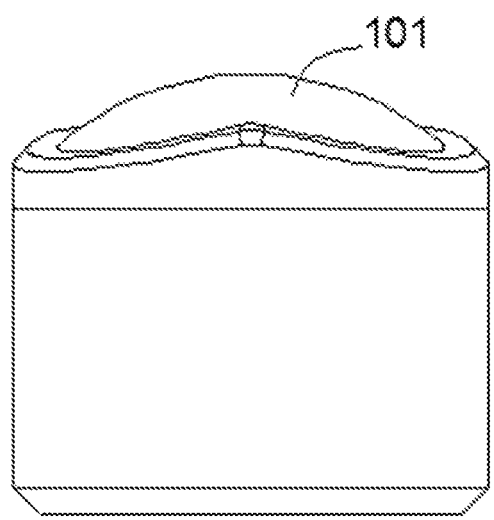
FIG. 4 is a front view of the polycrystalline diamond compact in FIG. 3.
Figure 5:
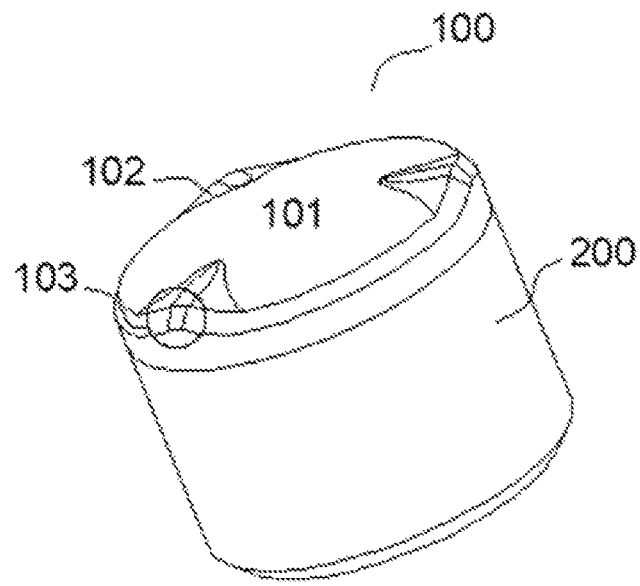
FIG. 5 is a schematic diagram of the polycrystalline diamond compact having a spherical central surface as described in the disclosure.
Figure 6:
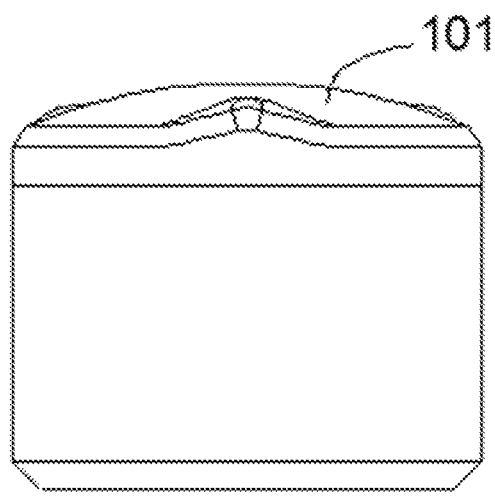
FIG. 6 is a front view of the polycrystalline diamond compact in FIG. 5.

When the protruding surface of the central part 101 is spherical, the area of the protruding surface is one third of the upper surface area of the polycrystalline diamond layer 100, and the vertical distance between the highest point and the lowest point of the spherical central part (refer to the height of the protruding surface) is one fourth of the thickness of the polycrystalline diamond layer 100, as shown in FIGS. 1 and 2. The thickness of the polycrystalline diamond layer refers to the vertical distance between the highest point of the protruding surface and a bottom surface of the polycrystalline diamond layer. Optionally, the area of the protruding surface can be three fifth of the upper surface area of the polycrystalline diamond layer 100, and the vertical distance between the highest point and the lowest point of the spherical central part (refer to the height of the protruding surface) can be two fifth of the thickness of the polycrystalline diamond layer 100, as shown in FIGS. 3 and 4. Still optionally, the area of the protruding surface can be three fourth of the upper surface area of the polycrystalline diamond layer 100, and the vertical distance between the highest point and the lowest point of the spherical central part can be one fourth of the thickness of the polycrystalline diamond layer 100, as shown in FIGS. 5 and 6.

Figure 7:
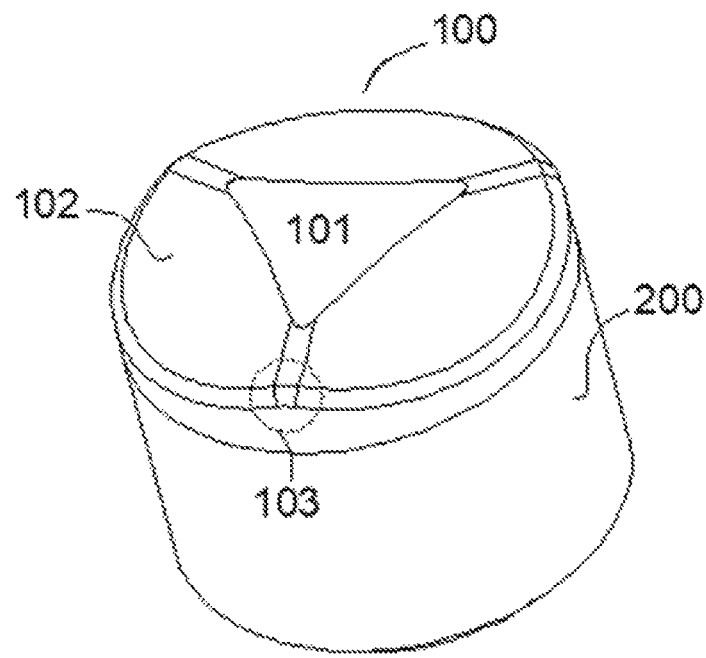
FIG. 7 is a schematic diagram of a polycrystalline diamond compact having a flat central surface as described in the disclosure.
Figure 8:
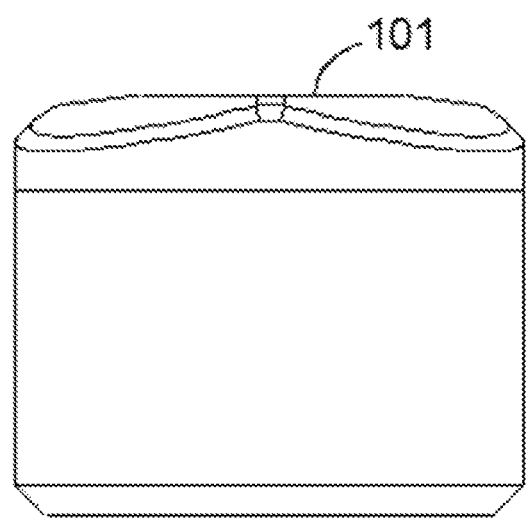
FIG. 8 is a front view of the polycrystalline diamond compact in FIG. 7.

When the protruding surface of the central part 101 is planar, the area of the protruding surface is one fifth of the upper surface area of the polycrystalline diamond layer 100, and the vertical distance between the highest point and the lowest point of the planar central part is one sixth of the thickness of the polycrystalline diamond layer 100, as shown in FIGS. 7 and 8.

Example 1

The polycrystalline diamond compact has a diameter of 15.88 mm, a height of 13.6 mm, and the polycrystalline diamond layer has a thickness of 3.5 mm. The polycrystalline diamond compact is prepared by high temperature and high pressure sintering combined with laser processing. The protruding surface of the central part is spherical. The area of the protruding surface is one third of the upper surface area of the polycrystalline diamond layer. The height of the central part is one seventh of the thickness of the polycrystalline diamond layer. The peripheral part comprises a plurality of radially-disposed ridges. The ridges function as the cutter teeth of the polycrystalline diamond compact. Each ridge comprises a top angle which is 152° facing the cemented carbide substrate. The length of each ridge, that is, the width of the peripheral part, is 2.0 mm. The peripheral part comprises a chamfer. The width of the chamber is 0.5 mm.

The polycrystalline diamond compact is subject to an impact resistance test. The results show the impact resistance of the non-planar polycrystalline diamond compact is improved by 150% in contrast to conventional polycrystalline diamond compacts. When using the polycrystalline diamond compact to grind a rock with a hardness of 10 grade, the cutting resistance decreases by 40%, the removal efficiency of the rock increases by 60%, and no failure such as teeth collapse occurs.

Example 2

The polycrystalline diamond compact has a diameter of 15.88 mm, a height of 13.6 mm, and the polycrystalline diamond layer has a thickness of 3.5 mm. The polycrystalline diamond compact is prepared by high temperature and high-pressure sintering combined with laser processing. The protruding surface of the central part is spherical. The area of the protruding surface is one fifth of the upper surface area of the polycrystalline diamond layer. The height of the central part is one seventh of the thickness of the polycrystalline diamond layer. The peripheral part comprises a plurality of radially-disposed ridges. The ridges function as the cutter teeth of the polycrystalline diamond compact. Each ridge comprises a top angle which is 156° facing the cemented carbide substrate. The length of each ridge, that is, the width of the peripheral part, is 2.5 mm. The peripheral part comprises a chamfer. The width of the chamber is 0.5 mm.

The polycrystalline diamond compact is subject to an impact resistance test. The results show the impact resistance of the non-planar polycrystalline diamond compact is improved by 110% in contrast to conventional polycrystalline diamond compacts. When using the polycrystalline diamond compact to grind a rock with a hardness of 10 grade, the cutting resistance decreases by 38%, the removal efficiency of the rock increases by 55%, and no failure such as teeth collapse occurs.

It will be obvious to those skilled in the art that changes and modifications may be made, and therefore, the aim in the appended claims is to cover all such changes and modifications.

What is claimed is:

1. A polycrystalline diamond compact, comprising a cemented carbide substrate having a longitudinal axis, and a polycrystalline diamond layer bonded to a top end of the cemented carbide substrate;
wherein:
the polycrystalline diamond layer is nonplanar and comprises a working face bounded by a circumference; the working face comprises a central part and a peripheral part surrounding the central part;
the central part is protruding relative to the peripheral part;
the central part is a planar surface or a domed surface;
the peripheral part comprises a plurality of cutting edges and peripheral surfaces consisting of the entire peripheral part except for the cutting edges;
each of the plurality of cutting edges is formed at the intersection of two peripheral surfaces, the intersection being a straight line and the two peripheral surfaces extending downward from the intersection in an opposite circumferential direction with respect to each other;
each of the plurality of cutting edges extends radially outward to the circumference of the working face thereby defining a joint point having the uppermost height of the circumference; the joint point is configured for providing a stress point in formations during drilling; and
each of the plurality of cutting edges is slanted downward and outward with respect to the longitudinal axis.

2. The polycrystalline diamond compact of claim 1, wherein the peripheral part comprises a chamfer.

3. The polycrystalline diamond compact of claim 1, wherein an area of the protruding surface accounts for 5-95% of a total surface area of the central part and the peripheral part.

4. The polycrystalline diamond compact of claim 3, wherein the area of the protruding surface accounts for 25-75% of the total surface area of the central part and the peripheral part.

5. The polycrystalline diamond compact of claim 1, wherein a vertical distance between a highest point and a lowest point of the protruding surface defines a height of the protruding surface, and a vertical distance between the highest point of the protruding surface and a bottom surface of the polycrystalline diamond layer defines a thickness of the polycrystalline diamond layer; the height of the protruding surface is between $1/50$ and $9/10$ of the thickness of the polycrystalline diamond layer.

6. The polycrystalline diamond compact of claim 5, wherein the height of the protruding surface is between $1/7$ and $3/7$ of the thickness of the polycrystalline diamond layer.

7. The polycrystalline diamond compact of claim 5, wherein the thickness of the polycrystalline diamond layer is between 0.5 and 8.0 mm.

8. The polycrystalline diamond compact of claim 5, wherein the height of the protruding surface is between 0.01 and 7.2 mm.

9. The polycrystalline diamond compact of claim 1, wherein the plurality of cutting edges each comprises a top angle which is between 50° and 179° facing the cemented carbide substrate, and the top angle is formed by the two peripheral surfaces in each of the plurality of cutting edges.

10. The polycrystalline diamond compact of claim 9, wherein a radial length of the plurality of ridges on the peripheral part is between 1/50 and 1/3 of a diameter of the polycrystalline diamond layer.

* * * * *